(12) United States Patent
Horsting

(10) Patent No.: US 7,521,648 B2
(45) Date of Patent: Apr. 21, 2009

(54) APPARATUS AND METHOD OF MAINTAINING A GENERALLY CONSTANT FOCUSING SPOT SIZE AT DIFFERENT AVERAGE LASER POWER DENSITIES

(75) Inventor: John James Horsting, Williamsburg, VA (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 674 days.

(21) Appl. No.: 10/986,043

(22) Filed: Nov. 12, 2004

(65) Prior Publication Data

US 2005/0092723 A1    May 5, 2005

Related U.S. Application Data

(62) Division of application No. 10/396,314, filed on Mar. 26, 2003, now Pat. No. 6,930,274.

(51) Int. Cl.
    *B23K 26/36* (2006.01)
(52) U.S. Cl. ................ 219/121.61; 219/121.71; 219/121.83
(58) Field of Classification Search ............ 219/121.61, 219/121.67–121.73, 121.78, 121.85
    See application file for complete search history.

(56) References Cited

U.S. PATENT DOCUMENTS

| 3,703,636 | A | * | 11/1972 | Schmitt ................. 362/298 |
| 3,704,930 | A | * | 12/1972 | McMahon ................ 359/19 |
| 4,128,752 | A | * | 12/1978 | Gravel ................ 219/121.68 |
| 4,740,708 | A | * | 4/1988 | Batchelder ............ 250/559.41 |
| 5,028,135 | A | * | 7/1991 | Cheung ................. 356/340 |
| 5,152,759 | A | | 10/1992 | Parel et al. |
| 5,229,569 | A | * | 7/1993 | Miyauchi et al. ......... 219/121.6 |
| 5,250,186 | A | * | 10/1993 | Dollinger et al. .......... 210/656 |
| 5,297,564 | A | * | 3/1994 | Love ...................... 128/898 |
| 5,319,183 | A | * | 6/1994 | Hosoya et al. ......... 219/121.68 |

(Continued)

FOREIGN PATENT DOCUMENTS

JP           360172068 A  *  9/1985

(Continued)

OTHER PUBLICATIONS

"Frequently Asked Questions about VISA Alignment Laser", by Alex Murokh, downloaded from www.bnl.gov, on Mar. 6, 2003.

(Continued)

*Primary Examiner*—Samuel M Heinrich

(57) ABSTRACT

Preferred embodiments of a system and methods to deliver different magnitudes of laser power density to a work piece while maintaining a constant focusing spot size are described. In particular, the system includes a laser, an optical focusing assembly and an overlay. The overlay receives a laser beam having a perimeter at a first magnitude of power and transmits the laser beam to the optical focusing assembly at about the same perimeter and at a magnitude lower than the first magnitude. In a preferred embodiment, the overlay can include an optically neutral blocking lens or a neutral density filter. A method of laser machining an orifice at a suitable average power density sufficient to machine the orifice with reduced heat affected zone, spatters, soots or recasts is described. A method of providing a focusing spot size of a generally constant effective area by a laser machining system is also described.

9 Claims, 1 Drawing Sheet

U.S. PATENT DOCUMENTS

| | | | | |
|---|---|---|---|---|
| 5,473,412 | A * | 12/1995 | Ozawa | 355/77 |
| 5,496,666 | A * | 3/1996 | Chu et al. | 430/5 |
| 5,501,925 | A * | 3/1996 | Smith et al. | 430/5 |
| 5,621,717 | A * | 4/1997 | Finkelstein et al. | 369/112.16 |
| 5,636,004 | A * | 6/1997 | Ootaka et al. | 355/67 |
| 5,650,877 | A * | 7/1997 | Phillips et al. | 359/726 |
| 5,651,784 | A * | 7/1997 | Klopotek | 606/5 |
| 5,670,069 | A | 9/1997 | Nakai et al. | |
| 5,835,513 | A * | 11/1998 | Pieterse et al. | 372/22 |
| 5,966,240 | A * | 10/1999 | Lange et al. | 359/583 |
| 5,966,394 | A * | 10/1999 | Spurr et al. | 372/34 |
| 6,097,411 | A * | 8/2000 | Maeoka et al. | 347/63 |
| 6,101,034 | A * | 8/2000 | Cox et al. | 359/562 |
| 6,117,706 | A | 9/2000 | Yoshioka et al. | |
| 6,118,516 | A * | 9/2000 | Irie et al. | 355/53 |
| 6,221,068 | B1 | 4/2001 | Fried et al. | |
| 6,288,384 | B1 | 9/2001 | Bahnmueller et al. | |
| 6,315,771 | B1 * | 11/2001 | Vinciguerra et al. | 606/5 |
| 6,404,499 | B1 * | 6/2002 | Stoeldraijer et al. | 356/400 |
| 6,414,980 | B1 * | 7/2002 | Wang et al. | 372/92 |
| 6,433,303 | B1 | 8/2002 | Liu et al. | |
| 6,492,617 | B2 * | 12/2002 | Nagahori et al. | 219/121.84 |
| 6,501,535 | B1 * | 12/2002 | Ozawa | 355/68 |
| 6,552,990 | B1 | 4/2003 | Kajiyama et al. | |
| 6,575,964 | B1 | 6/2003 | Hobart et al. | |
| 6,586,705 | B1 * | 7/2003 | Schell | 219/121.67 |
| 6,636,367 | B2 * | 10/2003 | Drodofsky et al. | 359/823 |
| 6,683,893 | B2 * | 1/2004 | Wang | 372/10 |
| 6,687,195 | B2 * | 2/2004 | Miyanishi et al. | 369/13.13 |
| 6,693,930 | B1 * | 2/2004 | Chuang et al. | 372/29.021 |
| 6,730,925 | B1 * | 5/2004 | Ozawa | 250/548 |
| 6,735,224 | B2 * | 5/2004 | Murry et al. | 372/20 |
| 6,831,936 | B1 * | 12/2004 | Smart | 372/26 |
| 6,943,086 | B2 * | 9/2005 | Hongo et al. | 438/308 |
| 6,944,111 | B2 * | 9/2005 | Nakamura et al. | 369/112.22 |
| 6,951,120 | B2 * | 10/2005 | McCaughan et al. | 65/392 |
| 2001/0027315 | A1 * | 10/2001 | Largent | 606/5 |
| 2003/0228723 | A1 * | 12/2003 | Yamazaki et al. | 438/164 |

FOREIGN PATENT DOCUMENTS

| | | | |
|---|---|---|---|
| JP | 404295327 A | * | 10/1992 |
| JP | 405187834 A | * | 7/1993 |
| JP | 406099297 A | * | 4/1994 |
| JP | 407161613 A | * | 6/1995 |
| JP | 410327129 A | * | 12/1998 |
| JP | 411347775 A | * | 12/1999 |
| JP | 02002035980 A | * | 2/2002 |
| JP | 02005153260 A | * | 6/2005 |

OTHER PUBLICATIONS

"Seeing the Light" by Ronald d. Schaeffer, www.circuitree.com, downloaded on Mar. 6, 2003.

"Choosing the Right Focusing Lens", by the Resource Center, www.ii-vi.com, downloaded on Mar. 6, 2003.

Section 3.2 Laser energy description, www.columbia.edu, downloaded on Mar. 7, 2003.

"Focusing Laser Beams", *Laser Applications Newsletter*, Issue 2, vol. 3, Oct. 9, 1999.

Section 2.7: TEM Mode, Beam Diameter, Focal Spot Size and Depth of Focus, www.columbia.edu, downloaded on Mar. 7, 2003.

"Cutting processes—laser cutting", *TWI*, www.twi.co.uk, downloaded on Mar. 6, 2003.

"Welding, Cutting & Drilling", GSI Lumonics, www.gsilumonics.com, downloaded on Mar. 6, 2003.

Spot Size, www.engin.umich.edu, downloaded on Mar. 6, 2003.

* cited by examiner

APPARATUS AND METHOD OF MAINTAINING A GENERALLY CONSTANT FOCUSING SPOT SIZE AT DIFFERENT AVERAGE LASER POWER DENSITIES

This divisional application claims the benefit under 35 U.S.C. §§ 120 and 121 of original application Ser. No. 10/396,314 filed on Mar 26, 2003, issued on Aug 16, 2005 as U.S. Pat. No. 6,930,274, which application is hereby incorporated by reference in its entirety in this divisional application.

BACKGROUND OF THE INVENTION

A laser can be used to machine a work piece by removing material or by drilling through the work piece. The laser can provide an unfocused laser beam that has a generally circular transverse cross-section relative to a beam axis A-A with spot size and power (or "irradiance"). The spot size is typically defined as the radial distance from the center of maximum irradiance to a location proximate 0.135 or $1/e^2$ times the maximum irradiance of the laser beam and measurable with a suitable device. Other techniques can also be used, alone or in conjunction with the previous technique to define the spot size such as, for example, a second moment technique. The spot size can be focused by an optical assembly to a smaller spot size (i.e., a focusing spot size) so that the power of the laser beam can be concentrated over a smaller area, thereby allowing the laser beam to deliver a sufficient power density to the work piece in order to laser machine the work piece.

In laser machining the work piece, the power being applied to the work piece needs to be an appropriate magnitude so that the focusing spot can liquefy, vaporize, and/or ablate the material of the work piece. Where the power being delivered to the focusing spot is much greater than is needed, the focusing spot may cause the work piece to form a heat affected zone (thereby distorting the work piece) or splatter/recasts (thereby affecting the surface finish).

To control the power being delivered to the focusing spot, pulse repetition rate, pulse width, and the laser itself, might be changed. It is commonly believed that a shutter like iris is interposed between the laser beam and the optical focusing assembly. The iris operates to reduce the area of laser light passing through the iris, thereby controlling the power of the focusing spot. The size of the focusing spot in this set up is generally inversely related to the size of the opening of the iris.

As such, whenever the power of the focusing spot size is controlled by changing the beam diameter of laser light passing through the iris, the focusing spot size changes in an inverse manner. For example, when the unfocused beam diameter is reduced through the iris, the focusing spot size increases. The increases in focusing spot size can therefore change the resolution at which the focusing spot size can machine the work piece. Furthermore, when the focusing spot size is changed, the depth of focus of the focused beam changes, which could require the work piece to be repositioned so that the work piece is within this depth of focus for consistent laser machining results. In order to maintain the same focusing spot size or depth of focus, it is believed that the focal length of the focusing lens could be changed to a shorter focal length lens. However, changing the focusing lens could require additional set up time that would affect the overall production efficiency of the laser machining process. Furthermore, when the focal length is reduced, lens aberrations tend to increase. Even though lens aberrations may be correctable using multiple-element focusing optics that would, again, add to set up time and potentially the ability to manufacture the work piece efficiently. Thus, there is an interplay between at least the beam diameter, focusing spot size, focal length of a focusing lens, focusing depth, and even the type of material or dimensions of the work piece that must be taken into consideration whenever the laser power is controlled to a magnitude below its maximum power. This interplay is believed to increase the complexity of the laser machining system.

It would be desirable to maintain a constant focusing spot size regardless of the beam diameter or power being delivered to the focusing spot. It would also be desirable to maintain a generally constant depth of focus regardless of the power being delivered to the focusing spot. It is believed that maintaining these parameters generally constant over a range of power being delivered to the focusing spot would reduce the number of parameters to be considered in a laser machining process.

SUMMARY OF THE INVENTION

The present invention provides the ability to deliver different magnitudes of laser average power density to a work piece while maintaining a constant focusing spot size. In particular, the present invention provides a system that includes a laser, an optical focusing assembly and an overlay. The overlay receives a laser beam having a perimeter at a first magnitude of power and transmits the laser beam to the optical focusing assembly at about the same perimeter and at a magnitude lower than the first magnitude.

In yet another aspect of the present invention, a method of laser machining an orifice in a workpiece by a laser system is provided. The system has an optical focusing assembly. The method can be achieved, in part, by evaluating an orifice formed by via a focusing spot size of a first effective area formed by transmission of a laser beam through the optical focusing assembly to the work piece at a rated maximum power of the laser system for splatters, recasts or heat affected zone proximate the orifice; and reducing average power density of the focusing spot size via an overlay between the laser beam and the optical focusing assembly to a suitable average power density sufficient to machine an orifice while maintaining the first effective area so that an splatters, recasts or heat affected zone is reduced.

In yet another aspect of the present invention, a method of providing a focusing spot size of a generally constant effective area generated by a laser machining system is provided. The laser machining system includes an optical focusing assembly disposed proximate a workpiece. The method can be achieved, in part, by focusing a laser beam to a focusing spot of a first power density with a first effective area at the work piece so that the focusing spot machines the work piece; and reducing the first power density of the focusing spot to a second average power density lower than the first at generally the same effective area as the first effective area.

BRIEF DESCRIPTIONS OF THE DRAWINGS

The accompanying drawings, which are incorporated herein and constitute part of this specification, illustrate an embodiment of the invention, and, together with the general description given above and the detailed description given below, serve to explain the features of the invention.

DETAILED DESCRIPTION OF THE PREFERRED EMBODIMENTS

Figure 1:
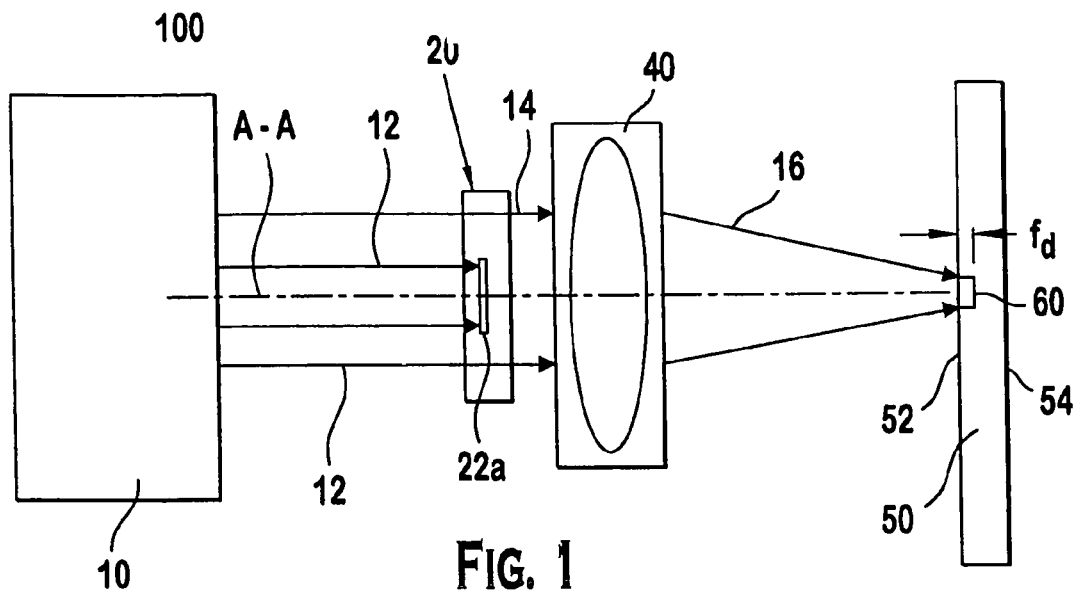
FIG. 1 is a simplified schematic side view of the components of a system involved in the formation of a generally constant focusing spot size at different average power densities according to a preferred embodiment.
Figure 2:
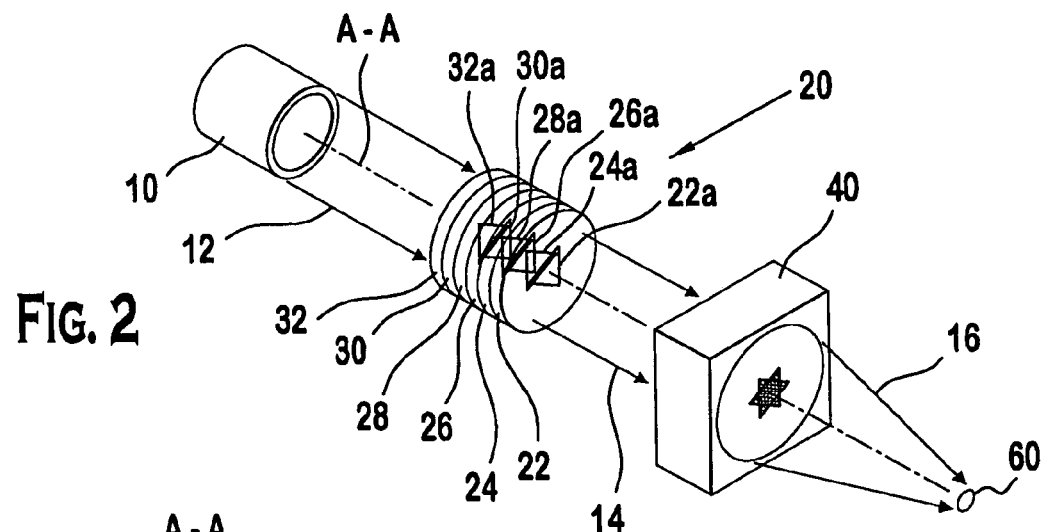
FIG. 2 is a perspective view of a laser beam according to a preferred embodiment.
Figure 3:
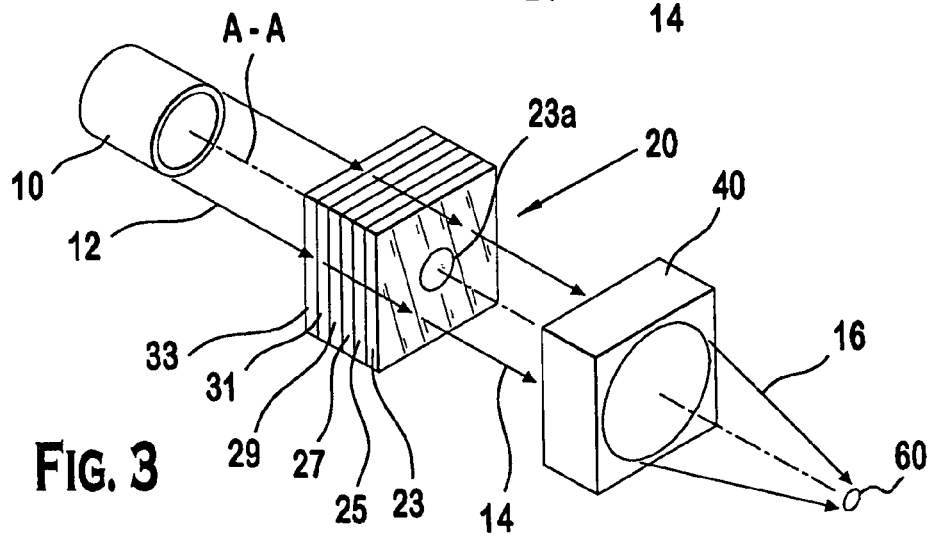
FIG. 3 is a schematic view of a laser machining system using neutral density filters.

FIGS. 1-3 illustrate preferred embodiments of laser systems that allow a focusing spot of generally the same size to be used at different average power densities.

Referring to FIG. 1, a laser system 100 includes a laser 10, an overlay 20, optical focusing assembly 40 and a work piece 60. The laser 10 provides a laser beam 12 of generally coherent light that can also be nearly monochromatic and generally collimated along a beam axis A-A through an optical overlay 20 towards optical focusing assembly 40. The optical focusing assembly 40 focuses a moderated laser beam 14 transmitted through the overlay 20 to a focusing beam 16 aimed at the surface of a work piece 50 to define a focusing spot size 60 that has a focus depth $F_d$, which is a function of at least the focusing spot size and focal length.

The laser 10 can provide laser beam 20 of a different cross-sectional area, such as, for example, square, rectangular, circular or other suitable polygons. In a preferred embodiment, the laser beam 20 is generally circular in a transverse cross-sectional area, shown here in the perspective view of FIG. 2. Power distribution of the laser beam 20 can be correlated to the diameter of the cross-sectional beam area 80 to provide for various beam profiles that includes a Gaussian beam profile, and preferably, a top-hat profile.

The laser light source 10 can be any laser with sufficient power density (i.e., quantifiable as Watt per centimeter squared) "to machine" a work piece. As used herein, the term "to machine" or "machining" denotes that application of a laser light of a sufficient power density to remove materials on one or more of the surfaces of the work piece 50 in order to form, for example, surface geometries or to drill through the work piece between the first and second surfaces in order to form, for example, orifices of different cross-sections. Preferably, the laser light source 10 can be Model LM100, LM100X, or LM150 sold by Oxford Laser™ that can provide at least 3 Watts of power at a pulse repetition between 10 to 25 kHz with a rated power density of at least one Megawatt per centimeter-squared (1 Megawatt/$cm^2$). More preferably, the power density of the laser light source 10 should be less than or equal to $1 \times 10^{12}$ Watts per centimeter-squared (1 Terawatt/$cm^2$) and the laser light source 10 can be a solid state laser, a copper vapor laser, a Neodymium:Vanadate (Nd:VAN) laser, or a frequency doubled Neodymium:Yttrium-Aluminum-Garnet (Nd: YAG) laser having a wavelength between approximately 511 nanometers to approximately 578 nanometers and a beam diameter of approximately 25 millimeters between diametrical positions on the periphery of the beam.

The overlay 20 can be any suitable member that moderates or attenuates the amount of light being transmitted through the overlay without changing the size of the periphery or spectrum of the laser beam 12. Moreover, such member can block or reduce a portion of light transmitted to the overlay while permitting another portion of the light to be transmitted through the overlay without changing the direction of the another portion of light. Preferably, the overlay 20 blocks a portion of the beam 12 proximate the beam axis A-A and permits the remainder of the beam 12 to pass through proximate its periphery.

In one preferred embodiment, the overlay is at least one optical lens 22 that is optically neutral in that the lens does not change the direction of light ray extending through the lens. The optical lens can be provided with a light blocking polygon 22a (i.e., an "optically neutral blocking lens") disposed about an axis of the lens or about the beam axis A-A (FIG. 2). In particular, the polygon is positioned with its center generally coincident on the beam axis A-A. By interposing the optical lens 22 with the light blocking polygon 22a, which in the preferred embodiment is an equilateral triangle, between the laser beam 12 and the focusing optic assembly 40, the laser beam 12 is moderated or attenuated to a lower power level, denoted in FIGS. 1-3 as attenuated beam 14. Preferably, the attenuated beam 14 can be focused by the focusing optical assembly 40 to form a focusing beam 16 that provides a focusing spot size 60 on the work piece 50 having an effective area as defined by a suitable technique and preferably is defined by a diameter between distal points having about $1/e^2$ time the maximum intensity of the laser beam 12.

Thus, a single lens 20 with a light blocking triangle 22a that can block approximately a preset percentage of light transmitted to the single optically neutral blocking lens 22 can moderate the beam 12 to provide for a moderated or attenuated beam 14 of less that 100% of the power of the beam 12. Consequently, by providing more than one lens, the power of the beam 12 can be attenuated in a step wise or continuous fashion. In one preferred embodiment, six lenses, 22, 24, 26, 28, 30, and 32 with each having a triangle 22a, 24a, 26a, 28a, 30a and 32a of generally identical area and dimensions are provided. The six lenses are stacked along the beam axis and configured so that that each lens is rotatable independently of the rest. Therefore, to vary the amount of light being transmitted to the focusing optic assembly 40, the lenses can be rotated between a first position where at least one side of each triangle of the lenses is contiguous to a common plane passing through the beam axis. That is to say, in the first position, an observer on the focusing optic assembly 40 would observe only a single triangle blocking the laser beam 12. To further reduce the amount of light being transmitted, lenses 24, 26, 28, 30, and 32 can be rotated about the beam axis A-A so that the triangles can be arrayed at various arcuate sectors about the beam axis A-A to achieve an increase in the area blocking the laser beam 12. To minimize the amount of power transmitted to the focusing optic assembly 40, the triangles can be rotated to a second position so that they can form a suitably shaped polygon having a maximum area greater than the triangle to block the laser beam 12.

The focusing optic assembly 40 can include any suitable optics that allow the moderated beam 14 to be focused or directed to the workpiece in the preferred embodiments. Preferably, the focusing optic assembly 40 includes a positive lens in combination with a negative lens with a focal length of about 100 millimeters.

The work piece 50 can be of any suitable material and dimension or shapes for laser machining, including that of a thin metallic plate. Preferably, the work piece 50 is stainless steel and generally planar in shape with a first surface 52 generally parallel to a second surface 54 at a distance (i.e., a thickness "t") of approximately 50 to 600 microns, and more particularly of about 300 microns. Also preferably, the laser machine 10 is configured to machine generally circular orifices of consistent orifice quality extending through the work piece 50 of approximately 20 microns to 300 microns in diameter, and particularly one or more orifices of about 160 microns in diameter over a duration of one of a fraction of a millisecond, at least one millisecond, or in multiple pulses over a duration of about thirty seconds. Furthermore, it should be noted that the light source of FIGS. 1-3 can include a light source that, regardless of whether the light is collimated, non-collimated or a mixture thereof, provides a sufficient power density to machine a workpiece.

Referring to FIG. 3, the optical neutral lenses with light blocking polygons of FIG. 2 can be replaced with optical lenses 23, 25, 27, 29, 31, and 33 with each lens having a neutral density filter portion. The neutral density filter portion of each of the lenses 23, 25, 27, 29, 31, 33, such as, for example filter portion 23a of lens 23, can be interposed about the beam axis A-A with a perimeter of the filter portion 23a being generally less than the perimeter of the laser beam 12. As used herein, the term neutral density filter indicates an optical filter that reduces light intensity without affecting the spectrum or direction of the light being transmitted through the neutral density filter. Thus, to control the amount of power being delivered to the focusing optic 40, one or more neutral density filters can be stacked together along the beam axis A-A to moderate the power of the laser beam 12. In a preferred embodiment, each of the neutral density filters bearing lenses 23, 25, 27, 29, 31, and 33 reduces light transmission by about 5% for light having a spectrum between 400 and 800 nanometers.

In operation, the laser system 100 can be operated without an overlay to evaluate the effect of the power density of the laser beam 12 when the beam 12 is focused to a suitably sized focusing spot 60 based on the diameter of beam 12, the focal length of the optical focusing assembly 40. By evaluating the work piece 50 that has been laser machined by such focusing spot, a determination can be made as to whether the power density is higher than necessary based on the presence of potentially undesirable physical effects such as, for example, heat affected zone, recasts, soots or spatters. Preferably, during the evaluating of the laser beam without the overlay, the beam diameter is about 25 millimeters, which is provided to the optical focusing assembly 40 with a focal length of about 100 millimeters. The optical focusing assembly 40 provides for a focusing spot having an effective area defined by a diameter of about 10 microns by a suitable measurement technique. The average power density of the focusing spot can be changed while maintaining the same effective area by interposing the overlay 20 between the beam 12 and the optical focusing assembly 40. That is to say, the initial focusing spot generated without an overlay can be changed to a plurality of generally equal sized focusing spots at different average power densities by interposing an appropriate number of overlay members. In one preferred embodiment, each of the lenses 22, 24, 26, 28, 30, and 32 can be rotated about the beam axis A-A to block a suitable amount of laser light in order to achieve a desired average power density with generally a constant size focusing spot. In another preferred embodiment, neutral density filters bearing lenses 23, 25, 27, 29, 31, 33 and so on can be inserted or removed in order to achieve different average power densities with a generally constant size focusing spot.

Thus, it is believed that, at the very least, an increase in efficiency has been achieved by the preferred embodiments because the additional set up time that may be required by changing a focal length of an optical focusing assembly or by adjusting the position of the work piece relative to the optical focusing assembly has been rendered unnecessary.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What I claim is:

1. A method of laser machining an orifice in a workpiece by a laser system having an optical focusing assembly, the method comprising:
   evaluating an orifice formed via a focusing spot size of a first effective area formed by transmission of a laser beam through the optical focusing assembly to the work piece at a rated maximum power of the laser system for splatters, recasts or heat affected zone proximate the orifice; and
   reducing a power density of the focusing spot size via an overlay between the laser beam and the optical focusing assembly to a suitable power density sufficient to machine an orifice while maintaining the first effective area so that splatters, recasts or heat affected zone proximate the orifice is reduced;
   wherein the overlay comprises at least one optically neutral lens provided with a light blocking polygon within a perimeter of the laser beam, such that the light blocking polygon blocks a portion of the laser beam and permits a remainder of the laser beam to pass through the lens to the optical focusing assembly.

2. The method of claim 1, wherein the evaluating comprises transmitting the laser beam with a generally constant power of between 25-45 Watts at a repetition rate of about 10 kHz to 25 kHz.

3. The method of claim 2, wherein the laser beam comprises a beam diameter of approximately 25 millimeters with a wavelength between 500 and 600 nanometers extending towards the optical focusing assembly having a focal length of about 100 millimeters so that the optical focusing assembly focuses the beam towards the work piece with a focusing spot of about 10 microns at different power densities on a surface of the work piece.

4. A method of providing a focusing spot size of a generally constant effective area by a laser machining system, the laser machining system including an optical focusing assembly disposed proximate a workpiece, the method comprising:
   focusing a laser beam to a focusing spot of a first power density with a first effective area at the work piece so that the focusing spot machines the work piece; and
   reducing the first power density of the focusing spot to a second power density lower than the first power density at generally the same effective area as the first effective area;
   wherein the reducing comprises interposing at least one optically neutral blocking lens having a blocking area between the laser beam and the optical focusing assembly, such that the blocking area blocks a portion of the laser beam and permits a remainder of the laser beam to pass through the lens to the optical focusing assembly, the blocking area being within a perimeter of an area defined by the laser beam, each of the blocking areas being generally transverse to a beam axis.

5. The method of claim 4, wherein the reducing comprises transmitting the laser beam with a generally constant power of between 25-45 Watts at a repetition rate of about 10 kHz to 25 kHz.

6. The method of claim 5, wherein the laser beam comprises a beam diameter of approximately 25 millimeters with a wavelength between 500 and 600 nanometers extending towards the optical focusing assembly having a focal length of about 100 millimeters so that the optical focusing assembly focuses the beam towards the work piece with a focusing spot of about 10 microns at different power densities on a surface of the work piece.

7. The method of claim 4, wherein the interposing comprises stacking at least six optically neutral blocking lenses along the longitudinal axis, each of the optically neutral blocking lenses having a triangle as the blocking area disposed about the beam axis.

8. The method of claim 7, wherein the stacking comprises rotating the at least six optically neutral blocking lenses between a first position where at least one side of each triangle in each lens is contiguous to a common plane extending through the beam axis and to a second position where respective sides of two triangles in respective separate lenses are contiguous to a common plane passing through the beam axis.

9. The method of claim 8, wherein the rotating comprises continuously varying the second power density of the focusing spot as a function of the position of each of the lenses about the longitudinal axis.

* * * * *